March 24, 1953 L. B. LYNN 2,632,455
INERTIA CONTROLLED PILOT APPARATUS
Filed Feb. 21, 1948 2 SHEETS—SHEET 1
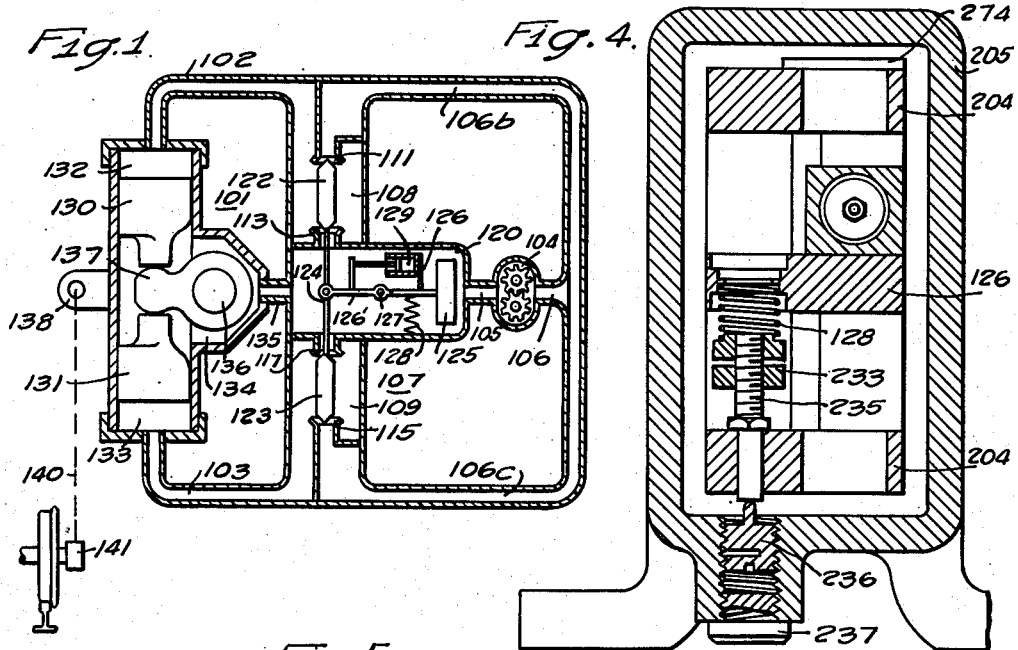
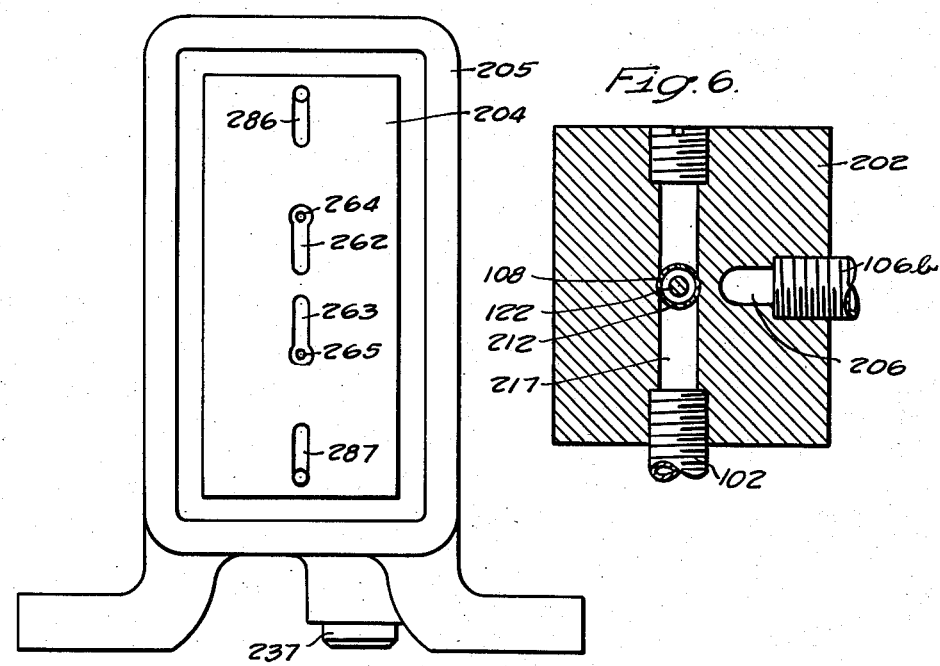
WITNESSES:
INVENTOR
Lawrence B. Lynn.
BY
ATTORNEY

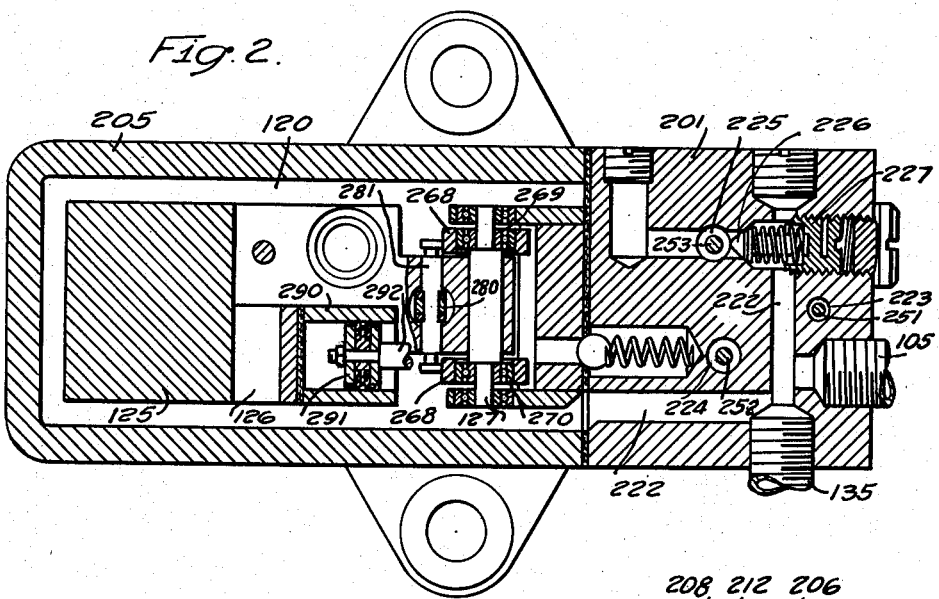
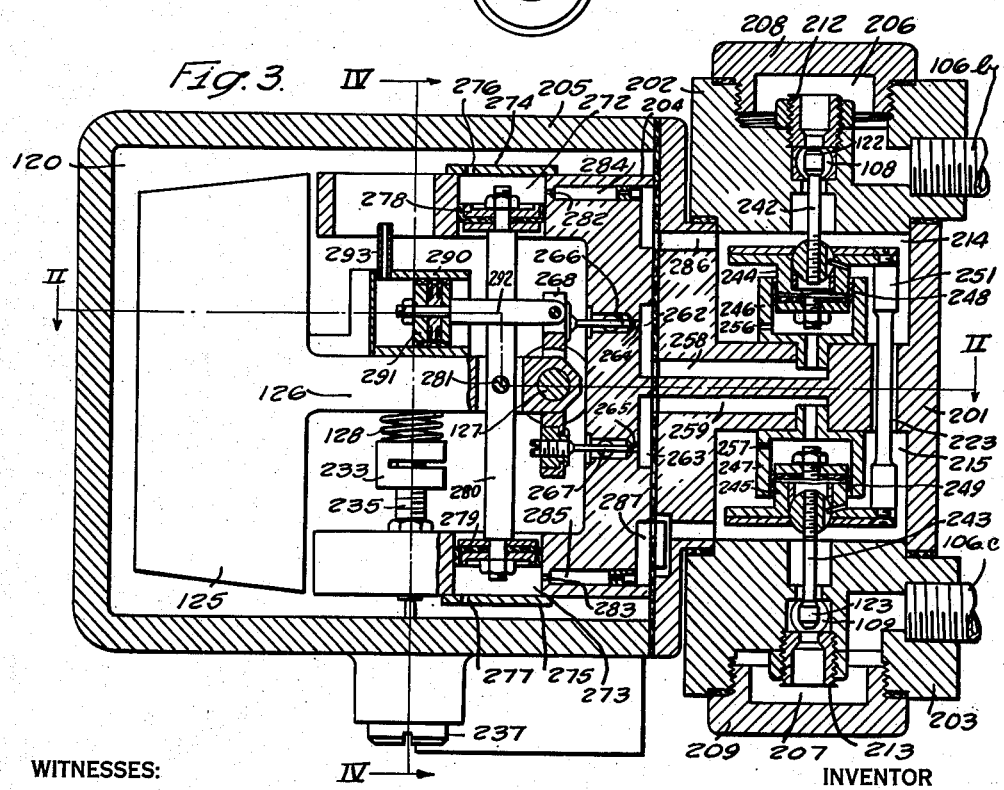

Patented Mar. 24, 1953

2,632,455

UNITED STATES PATENT OFFICE 2,632,455

INERTIA CONTROLLED PILOT APPARATUS

Lawrence B. Lynn, Pittsburgh, Pa., assignor to Westinghouse Electric Corporation, East Pittsburgh, Pa., a corporation of Pennsylvania Application February 21, 1948, Serial No. 10,162

5 Claims. (Cl. 137—45)

My invention relates to inertia controlled pilot apparatus for stabilizing equipment such as ride stabilizers on conveyances. In a more particular aspect, my invention involves inertia controlled pilot apparatus with valves for the control of hydraulic power systems of the type disclosed in the copending applications Serial No. 509,314 of C. R. Hanna, now Patent No. 2,492,990 of January 3, 1950, Serial No. 623,368 of L. B. Lynn and C. R. Hanna, now Patent No. 2,568,401 of September 18, 1951, Serial No. 794,145 now abandoned, of L. B. Lynn, and Serial No. 787,230 now Patent No. 2,520,944 of September 5, 1950, of L. B. Lynn and S. J. Mikina, all assigned to the assignee of the present invention.

Pilot apparatus of the kind here concerned perform a controlling action in response to oscillating forces or movements in predetermined planes or directions. The sensing element proper consists of an inertia member such as a pendulous or spring suspended mass, that is biased to normally remain in a center position and deflects to either side in response to the occurrence of movement to be stabilized. In the pilot apparatus disclosed in the above-mentioned applications, the inertia member serves to actuate two valves of a hydraulic system so that the deflection of the inertia member causes an increase in the flow area of one valve and a simultaneous decrease in the area of the other thus producing a corresponding pressure difference between two ducts controlled by the respective valves. The valves are interconnected and are exposed to pressures resulting from the controlled fluid flow. The pressures on the valves are normally equal and hence impose another centering bias on the valve assembly and on the inertia member connected therewith.

However, there are phenomena that tend to disturb the centering or balancing bias. For instance, when a vehicle equipped with an inertia controlled stabilizer is passing through a curve, a bias due to centrifugal force is superimposed on the spring bias of the inertia member and causes the member to deflect steadily toward one side of the normal center position. Other unbalancing effects may occur due to unequal thermal expansion of the valve structure, fatigue, and thermal creep of the centering springs of the inetria member. Any such unbalancing effect may interfere with the desired performance and is apt to reduce the effectiveness of the apparatus as regards the stabilization of oscillatory or shock disturbances and impose a steady pressure load on the pumps.

According to the above-mentioned copending application Serial No. 623,368, detrimental effects of such an unbalancing bias are prevented by providing an automatic re-centering device which, in response to a steady unbalance of the controlled valves, shifts the abutment of a centering spring in the direction required to compensate for the steady unbalancing influence. The present invention is also intended to automatically compensate such detrimental effects but aims at achieving this object by means of greatly simplified design.

My invention is based on the fact that the above-mentioned unwanted effects are all relatively slow as compared with the cyclical disturbances intended to be stabilized, the latter occurring at a frequency in the order of one cycle per second. The invention, therefore, consists essentially in the provision of a mechanical high-pass filter which is disposed between the inertia member and the pilot valves and capable of discriminating between high frequency movements to be transmitted and low frequency movement to be eliminated. This requires that the valve actuating structure or other element to be controlled by the inertia member be movable independently of the inertia member. It is also necessary to apply a centering bias to the controlled element independent of the centering bias of the inertia member, although, if the invention is applied to differentially acting balanced valves of the kind disclosed in the above-mentioned copending applications, such an independent centering of the controlled (valve actuating) element is inherent in the pressure-balanced valve design so that separate biasing springs for the controlled element are not required.

An embodiment of the invention is illustrated in the drawings, in which:

Figure 1 is a hydraulic circuit diagram of a stabilizing system controlled by an inertia responsive pilot apparatus according to the invention, while Figs. 2 to 6 show details of the pilot apparatus; more particularly, Fig. 2 is a cross section through the pilot apparatus taken along a plane denoted in Fig. 3 by the line II—II, Fig. 3 is a cross section taken at a right angle to Fig. 2 substantially along the center plane of Fig. 2, Fig. 4 is a section at a right angle to Fig. 3 along the plane denoted by the line IV—IV in Fig. 3, Fig. 5 is a view of part of the apparatus taken from the right of Fig. 3, and Fig. 6 is a section through a detail of the apparatus appearing in the right upper corner of Fig. 3, the section plane extending at a right angle to the plane of illustration of Fig. 3.

The hydraulic apparatus diagrammatically represented in Fig. 1 is especially designed for the control of stabilizing equipment, in particular for stabilizing the spring suspended body of a vehicle.

The device to be controlled is denoted as a whole by 101. It consists of a cylinder-and-piston device of a design similar to customary hydraulic shock absorbers. The device is controlled by the difference in the pressures applied to a pair of ducts or conduits 102, 103. Liquid under pressure is provided by a positive displacement pump 104 which has a return duct 105 and a pressure duct 106. The pressure duct 106 is split into two branch conduits 106b and 106c. Disposed between pump 104 and controlled device 101 is a pilot apparatus 107 whose housing structure has two cavities 108 and 109. Cavity 108 has two valve openings 111 and 113 in communication with the respective pump ducts 106b and 105 and controlled by two valve faces of a valve body 122. Cavity 109 has two valve openings 115 and 117 in communication with conduits 106c and 105, respectively, and controlled by valve faces of a valve body 123. The bodies 122 and 123 are interconnected by a rod 124. The control device or pilot apparatus 107 encloses a neutral pressure space 120 which is in free communication with the return conduit 105 and with the valve openings 113 and 117. An inertia weight 125 is movably suspended within the neutral pressure space 120. Weight 125 is mounted on an arm 126 which is pivoted about a shaft 127 and linked to the connecting rod 124. The weight 125 is normally held in center position by means of a biasing spring 128.

Another arm 126′ is pivoted about shaft 127 and linked to rod 124. A mechanical filter 129 of the dash-pot type has a cylinder attached to weight arm 126 and a piston linked to arm 126′. As will be explained below, the filter 129 behaves as if it were a rigid connection between arms 126 and 126′ when the weight performs rapid oscillations, but the filter 129 yields to slow movements and hence permits a centering adjustment of arm 126 independent from the centering adjustment of arm 126′.

The controlled stabilizing device 101 has a cylinder with two pistons 130 and 131 which form, together with the cylinder, two pressure spaces 132 and 133, respectively, and an intermediate neutral space 134. The neutral space is connected by a conduit 135 with the neutral space 120 of the control device 107 and with the return conduit 105 of the pump. The neutral space 134 of device 101 is traversed by a shaft 136 which carries a cylindrical transmitting member 137. Member 137 is engaged by the two pistons 130 and 131. An arm 138 is mounted on shaft 136 outside of device 101.

For the purpose of explanation, it may be assumed that the entire hydraulic system of Fig. 1 is mounted on the spring-supported body of a vehicle so that the plane of illustration represents a vertical plane of the vehicle body, the travelling direction of the vehicle being perpendicular to the plane of illustration. It may further be assumed that the apparatus serves for stabilizing vertical oscillations of the vehicle body, and that the peripheral end of arm 138 is linked to the unsprung mass of the vehicle as is schematically represented by a broken line 140 connecting the arm 138 to the journal structure 141 of the vehicle truck.

A vertical movement of the vehicle body relative to space, for instance in the upward direction, has the effect of causing a relative movement between the weight 125 and the housing structure of the pilot apparatus. That is, weight 125 tends to maintain its original position in space and hence moves downward relative to the upwardly accelerated housing structure. When this movement is fast enough to be transmitted through the filter 129, the valve structure is lifted so that the flow areas of valve openings 111 and 117 are diminished and those of valve openings 113 and 115 are increased. As a result, the pressure in cavity 108, duct 102 and pressure space 132 is reduced, and the pressure in cavity 109, duct 103 and pressure space 133 is increased. The previously balanced piston assembly of the device 101 is shifted in the upward direction so that arm 138 is turned clockwise, i. e., also in the upward direction. Hence, arm 138 and link 140 pull the vehicle body downward toward the unsprung vehicle structure 141 and counteract the moving tendency of the body. In this manner, the system is effective to prevent or diminish any vertical oscillations of the vehicle body.

As mentioned above, the mechanical filter 129 transmits any fast oscillations of the weight to the valve structure but yields to slow movements as may be caused by the effects of centrifugal force or by any other persistent deflecting bias acting on the weight or on the normally balanced valve structure. How this discriminatory filter action comes about will be understood from the following description of the pilot apparatus shown in detail in Figs. 2 to 6.

The pilot apparatus according to Figs. 2 to 6 contains a number of ducts, passages, cavities and other enclosed chambers or spaces which are formed by five bodies 201, 202, 203, 204, 205. These bodies are firmly and tightly attached to each other and form together a rigid housing and a support for a number of elements described hereinafter.

Bodies 202 and 203 have an entrance chamber 206 or 207 (Fig. 3) closed by a cover screw 208 or 209. Each entrance chamber has a threaded opening at which the pump outlet conduit 106b or 106c is attached. Sleeves 212 and 213 are inserted in bodies 202 and 203, respectively, and have each a cavity 108 or 109. Cavity 108 communicates through a valve opening with the entrance chamber 206 hence with the conduit 106b (Fig. 3). Cavity 109 communicates through a valve opening with the chamber 207 and hence with the conduit 106c which leads to the same pump outlet duct as the conduit 106b. Sleeve 212 has another (lower) valve opening through which the cavity 108 (Fig. 3) communicates with an intermediate pressure chamber 214 which, in turn, communicates with the neutral pressure space 120 within body 205 in a manner to be described in a later place; and cavity 109 (Fig. 3) has another (upper) valve opening in communication with another intermediate pressure chamber 215 also in hydraulic connection with the neutral pressure space 120. Two valve bodies 122 and 123 are movable in the respective cavities. Each of bodies 122 and 123 has two valve faces to cooperate with the respective two valve openings of each cavity (as explained above with reference to Fig. 1).

Across bore 217 in body 202 (Fig. 6) is in free communication with cavity 109 and is plugged at one end. The other end of bore 217, selected for most convenient installation, receives the end of conduit 102 leading to the controlled device 101 (see Fig. 1). The design of body 203 (Fig. 3) is similar to that of body 202 shown in Fig. 6, except that the cavity 109 in body 203 is in free communication with the conduit 103 of the controlled device.

The neutral space 120 within body 205 (Fig. 2) is in free communication with a group of interconnected bores 222 of body 201. These bores have three threaded openings toward the exterior. One opening is plugged. The two others, selected for convenient installation, receive respectively the pump inlet conduit 105 and the neutral conduit 135 leading to the neutral space of the controlled device.

The two intermediate pressure chambers 214 and 215 (Fig. 3) communicate with each other through bores 223, 224, 225 (Figs. 2, 3) of body 201. Bore 225 communicates with bores 222 (Fig. 2) under control by a spring biased pressure-control valve 226 adjustable by means of a screw 227. Valve 226 checks the flow of liquid from bores 222 to the intermediate pressure chambers 214, 215 but permits a flow in the reverse direction if the pressure in the intermediate chambers exceeds an adjusted value. Hence, the setting of valve 226 determines the pressure difference maintained between the intermediate chambers 214, 215 and the neutral space 120.

The inertia weight 125 is mounted on an arm 126 whose pivot shaft 127 is journalled in ball bearings mounted on body 204 (Figs. 2, 3 and 4). The centering spring 128 for weight 125 rests against an abutment 233 which is in threaded engagement with a screw 235 mounted on body 204. The abutment is set for adjusting and roughly balancing the centering force of spring 128. A correct balance is secured by shifting the screw 235 with the aid of a calibrating screw 236 threaded into a bore of body 205 and accessible from the outside after removal of a cover screw 237 (Fig. 4).

The valve bodies 122 and 123 are mounted on rods 242 and 243, respectively (Fig. 3). The rods are attached to respective piston structures 244 and 245 which are movable in cylinders 246 and 247 and have cup-shaped packings 248 and 249, respectively. The two piston structures are interconnected by struts 251, 252, 253 (Figs. 2, 3) which pass through the respective bores 223, 224 and 225. Consequently, the two valve bodies 122 and 123 form part of a rigid valve structure and move in unison in the same manner as explained above with respect to Fig. 1.

The just-mentioned cylinder-and-piston devices disposed in the intermediate pressure chambers 214 and 215 represent variable-volume containers for actuating the valve structure. Each of cylinders 246 and 247 communicates through an orifice 256 or 257 with the intermediate pressure chamber 214 or 215 and has an outlet passage in communication with a duct 258 or 259 of body 201 (Fig. 3). Ducts 258 and 259 open into cavities 262 and 263, respectively (Figs. 3, 5), which are connected with the neutral space 120 through respective orifices 264 and 265. The flow areas of these orifices are controlled by poppet valves (pilot valves) 266 and 267 (Fig. 3). The two pilot valves are controlled in inverse relation to each other by a teeter bar 268 which is pivoted about the shaft 127 of the weight arm 126 but journalled in separate bearings 269 and 270 (Fig. 2) and hence movable independently of the weight 125. The frequency discriminating filter, denoted as a whole by 129 in Fig. 1, comprises a dashpot cylinder 290 and a piston 291 with a cup-type packing. Cylinder 290 is firmly secured to the weight arm 126, and piston 291 has a piston rod 292 linked to the teeter bar 268 (Fig. 3). The cylinder 290 has a capillary leak formed by a capillary tube 293 whose cross section and length are chosen in accordance with the desired time constant. Cylinder 290 is filled with liquid and communicates through tube 293 with the liquid-filled neutral space 120. The dash-pot filter transmits forces between weight arm and teeter bar in proportion to the relative velocity of cylinder and piston. The dash-pot volume and the capillary tubes are proportioned so that this velocity is very low for the maximum required valve force. The effect of the filter on the sensitivity of the pilot apparatus is therefore negligible. Fast oscillations of the weight 125 are transmitted, without appreciable loss, to the teeter bar so that the latter follows oscillation-responsive weight movements without delay and through the entire range of movement without appreciable slipping. When the weight and the teeter bar are not affected by oscillations to be responded to, the weight is centered by its own spring bias to the proper center position, and the teeter bar is independently biased toward its center position due to the normally balanced biasing forces due to the jet stiffness of the pilot valves 266 and 267, the degree of accuracy of this centering bias being limited only by the friction of the teeter bar bearings and the friction of pistor 291 in cylinder 290. Any steady influences, tending to hold the weight of the teeter bar deflected from the normal center position, are not transmitted through the filter because the filter yields to the slow movement caused by such phenomena. For instance, if the teeter bar should become deflected from the normal center position, the filter nevertheless permits the weight to remain independently centered or to become re-centered by its own centering bias. In this manner, the filter operates as an automatic re-centering device.

Considering in the following only the response to fast oscillations with respect to which the filter may be considered a rigid link between inertia member and pilot valves, the pilot apparatus as a whole operates in the following manner.

When the weight 125 and the pilot valves are in the illustrated center positions, the flow areas of the two pilot valves are equal. Then pressure obtaining between the orifices 256 and 264, i. e., within cylinder 246, is equal to the pressure obtaining between the orifices 257 and 265, i. e., within cylinder 247. Consequently, the force imposed by the pistons 244 and 245 on the valve structure are balanced, and the valve structure is normally in the illustrated centered position. When the inertia weight deflects from the center position, one pilot valve reduces its flow area and the other increases its flow area. The pressures in the cylinders 246 and 247 become different from each other so that one piston moves inwardly and the other, outwardly of the appertaining cylinder. As a result, the valve assembly moves one or the other away depending upon the direction of weight deflection. The hydraulic transmission between the inertia weight and the compound main valves represents a power multiplying or amplifying system. That is, small variations in force or displacement imposed on the pilot valves cause proportionate variations of amplified forces or displacements to occur at the main valves. Hence, the device according to Figs. 2 to 6 provides amplification in addition to that inherent in the hydraulic system of the main valves. It may be mentioned, however, that for many purposes, including the control of stabilizing equipment, the amplification obtainable by the main valve system is sufficient so that the filter element 129 may be directly linked to the main valve structure thus permitting a considerable simplification of the device (see Fig. 1).

For inertia controlled vehicle stabilizing equipment a control performance proportional to the velocity of the movements to be stabilized is usually desirable. Since the movements of an inertial weight relative to its support are proportional to acceleration if the weight is subjected to an elastic bias only, damping means are provided to receive the preferred velocity-proportional deflection. These damping means, as shown in Fig. 3, are disposed and designed in the following manner.

Body 204 has two coaxial bores 272 and 273 which form dashpot cylinders and are covered by respective plates 274 and 275. Each plate has an orifice 276 or 277. Pistons 278, 279 with cup-shaped packings are movable in the cylinders and are rigidly interconnected by a rod 280. Rod 280 passes through an opening in weight arm 126 (Figs. 2, 3) and is pivotally linked to arm 126 by a shaft 281. Cylinders 272 and 273 communicate through an orifice 282 or 283 and a duct 284 or 285 with a cavity 286 or 287 (Figs. 3, 5) which is hydraulically connected to the intermediate pressure chamber 214 or 215 (Fig. 3). Hence, there is a steady flow of liquid from chamber 214 through a bleeder passage 286—284—282—272—276 to the neutral pressure space 120. A similar bleeder passage 287—285—283—273—277 leads from intermediate pressure chamber 215 to neutral space 120. Any movement of weight 125 about its center position causes the damper pistons 278 and 279 to reduce the enclosed volume of one cylinder and to increase that of the other cylinder. The expanding cylinder space draws liquid through the orifices 276, 282 or 277, 283 and the compressed cylinder space expels liquid through the respective orifices so that the piston movements are damped. In one orifice of each cylinder the flow component due to piston movement is in the direction of the steady flow from the intermediate pressure chamber to the neutral space, while in the other orifice the two flow components are in opposition to each other. Under these conditions the damping effect is independent of changes in viscosity of the liquid and is substantially proportional to the piston velocity. In order to further elucidate this performance, it may be mentioned that the pressure drop through a thin-walled orifice is proportional to the square of the velocity of the fluid flow of the orifice, independent of the viscosity of the fluid. Linearity between damping and velocity comes about because the modulated flow component due to piston movement is impressed on the steady flow within a fairly straight range of the velocity-pressure characteristic. The existence of a steady flow of liquid through the cylinder spaces has the further effects that the damping force is substantially proportional to the piston movement, that the cylinders are automatically filled when the source of pressure liquid is put in operation, and that any initially enclosed air bubbles are scavenged out of the cylinder. Besides, by adjusting or selecting the flow resistance of the bleeder passages and orifices so that the average pressure in the cylinder is not higher than the mean value of the modulated pressure, the leakage losses and the friction at the cup-shaped packings can be kept at a minimum.

Due to the steady flow of liquid from the intermediate pressure chambers 214, 215 (Fig. 3) to the neutral space 120 through the bleeder passages of the actuating cylinders 246, 247, the latter cylinders are also scavenged by a steady flow of liquid and the force imparted to their respective pistons is proportional to the pressure variation or movement of the pilot valves. In order to reduce leakage losses and friction at the cup-type packings 248, 249 the average pressure within the actuating cylinders may also be adjusted to be not appreciably higher than the mean modulated pressure.

While I have exemplified my invention by an embodiment otherwise based on features disclosed in the above-mentioned application, Serial No. 787,230, it can readily be applied to pilot apparatus as shown in the above-mentioned other applications as well as to any other inertia-controlled pilot apparatus regardless of whether the controlled system is hydraulic, electric or otherwise and whether the inertia member is a relatively movable mass or a gyroscope. In other words, apparatus according to the invention can be modified in various respects and may be realized by structural embodiments other than those specifically illustrated and described, without departing from the essence of the invention and within the essential features of the invention set forth in the claims annexed hereto.

I claim as my invention:

1. An inertia responsive control apparatus, comprising a support, two valves, a teeter bar having a pivot shaft mounted on said support and having two arms associated with said valves respectively for controlling them in inverse relation to each other, an inertia weight pivoted about the axis of said shaft, spring means disposed between said support and said weight for biasing said weight toward a normal position, and a dash-pot device having two relatively movable members forming together a variable volume chamber and being attached to said weight and said teeter bar respectively, said device having a capillary duct through which said chamber communicates with the exterior space, and a housing for liquid enclosing said teeter bar and said weight and said device.

2. An inertia responsive control apparatus, comprising a support, two valves, a movable member connected to both of the two valves and movably mounted on said support for controlling said valves in inverse relation to each other, an inertia weight movably mounted on said support, spring means disposed between said support and said weight for biasing said weight toward a normal position, and a dashpot device having two relatively movable members forming together a variable volume chamber and being attached to said weight and said movable member respectively, said dashpot device having a small opening therein through which said chamber communicates with the exterior space, and a housing for liquid enclosing said movable member and said weight and said dashpot device.

3. In an apparatus responsive to vertical movement of a conveyance, the combination of a support, a member to be controlled movably mounted on said support and yieldably restrained in a predetermined position, a passive mass movably mounted on said support for movement in a substantially vertical plane, a spring subject to creep yieldably supporting said mass in said vertical plane and urging said mass to a given position, said mass being movable from said given position upon acceleration of said support in the plane of movement of said mass, coupling means connecting said mass to said member to be controlled to actuate said member from its predetermined position, said mass being also displaceable from said given position upon the occurrence of creep in said spring, and a dashpot device forming a part of said coupling means to permit movement of said mass from said given position to a new position with creep of said spring without displacing said member to be controlled from its predetermined position.

4. In stabilizer apparatus, a passive inertia control member, means movably supporting said inertia control member for movement in a given plane, spring means biasing said inertia control member to a given position, said spring means being subject to drift due to fatigue and permitting displacement of said control member from said given position, a controller device adapted for actuation by said inertia control member upon movement thereof in said given plane, and dashpot means connected between said inertia control member and said controller device to actuate said controller device and to compensate said drift of said spring means.

5. In stabilizer apparatus, a pick-off device having a member movable from a neutral position for controlling said pick-off device, a passive inertia control element, means movably supporting said inertia control element for movement in a given plane, spring means subject to creep yieldably biasing said inertia control element toward a given position, coupling means connecting said inertia control element to said member to actuate said member from its neutral position upon displacement of said inertia control element, and dashpot means included in said coupling means and connected between said member and said inertia control element to permit movement of said inertia control element from said given position to a new position with creep of said spring without displacing said member from its neutral position.

LAWRENCE B. LYNN.

REFERENCES CITED

The following references are of record in the file of this patent:

UNITED STATES PATENTS

| Number | Name | Date |
|---|---|---|
| 1,423,786 | Zoelly | July 25, 1922 |
| 1,588,422 | Howell | June 15, 1926 |
| 1,831,601 | Le Valley | Nov. 10, 1931 |
| 2,011,243 | Griswold | Aug. 13, 1935 |
| 2,299,117 | Von Mantenffel | Oct. 20, 1942 |
| 2,492,990 | Hanna | Jan. 3, 1950 |